*US011147093B2*

(12) United States Patent
Ozturk et al.

(10) Patent No.: US 11,147,093 B2
(45) Date of Patent: Oct. 12, 2021

(54) SYSTEM INFORMATION SCHEDULING

(71) Applicant: QUALCOMM Incorporated, San Diego, CA (US)

(72) Inventors: Ozcan Ozturk, San Diego, CA (US); Heechoon Lee, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/453,573

(22) Filed: Jun. 26, 2019

(65) Prior Publication Data
US 2020/0008224 A1 Jan. 2, 2020

Related U.S. Application Data

(60) Provisional application No. 62/691,525, filed on Jun. 28, 2018.

(51) Int. Cl.
*H04W 72/12* (2009.01)
*H04W 56/00* (2009.01)
*H04W 72/04* (2009.01)
*H04W 76/11* (2018.01)

(52) U.S. Cl.
CPC ..... *H04W 72/1273* (2013.01); *H04W 56/001* (2013.01); *H04W 72/042* (2013.01); *H04W 72/046* (2013.01); *H04W 76/11* (2018.02)

(58) Field of Classification Search
CPC ... H04W 48/12; H04W 56/00; H04W 56/001; H04W 72/04; H04W 72/042; H04W 72/046; H04W 72/0446; H04W 72/12; H04W 72/1273; H04W 74/00; H04W 74/006; H04W 74/11
See application file for complete search history.

(56) References Cited

U.S. PATENT DOCUMENTS

| | | | | |
|---|---|---|---|---|
| 9,154,260 | B2 * | 10/2015 | Chen | H04L 1/004 |
| 9,294,885 | B2 * | 3/2016 | Hegde | H04W 72/1289 |
| 9,510,250 | B2 * | 11/2016 | Narasimha | H04W 36/0088 |
| 9,723,626 | B2 * | 8/2017 | Golitschek Edler Von Elbwart | H04L 5/1438 |
| 10,383,035 | B2 * | 8/2019 | Sheng | H04W 76/14 |
| 10,420,105 | B2 * | 9/2019 | Sun | H04W 72/042 |
| 10,440,638 | B2 * | 10/2019 | Jiang | H04W 48/14 |
| 10,506,494 | B2 * | 12/2019 | da Silva | H04W 48/10 |

(Continued)

FOREIGN PATENT DOCUMENTS

WO 2018064279 A1 4/2018

OTHER PUBLICATIONS

International Search Report and Written Opinion—PCT/US2019/039514—ISA/EPO—dated Sep. 10, 2019.

*Primary Examiner* — Tri H Phan
(74) *Attorney, Agent, or Firm* — Qualcomm Incorporated

(57) ABSTRACT

Various aspects of the present disclosure generally relate to wireless communication. In some aspects, a user equipment may receive a system information (SI) message in an overlapped scheduling window; and identify the SI message based at least in part on at least one of: downlink control information (DCI) for the SI message, a system information radio network temporary identifier (SI-RNTI) of the SI message, a time location of the SI message in the overlapped scheduling window, a search space for the DCI, or a combination thereof. Numerous other aspects are provided.

21 Claims, 8 Drawing Sheets

(56) References Cited

U.S. PATENT DOCUMENTS

| | | |
|---|---|---|
| 2010/0272017 A1 | 10/2010 | Terry et al. |
| 2017/0295565 A1 | 10/2017 | Golitschek Edler Von Elbwart et al. |
| 2019/0222293 A1* | 7/2019 | Lee ...................... H04W 72/046 |
| 2019/0274094 A1* | 9/2019 | Lu ........................ H04W 72/042 |
| 2020/0374848 A1* | 11/2020 | Zhang ....................... H04L 5/00 |

* cited by examiner

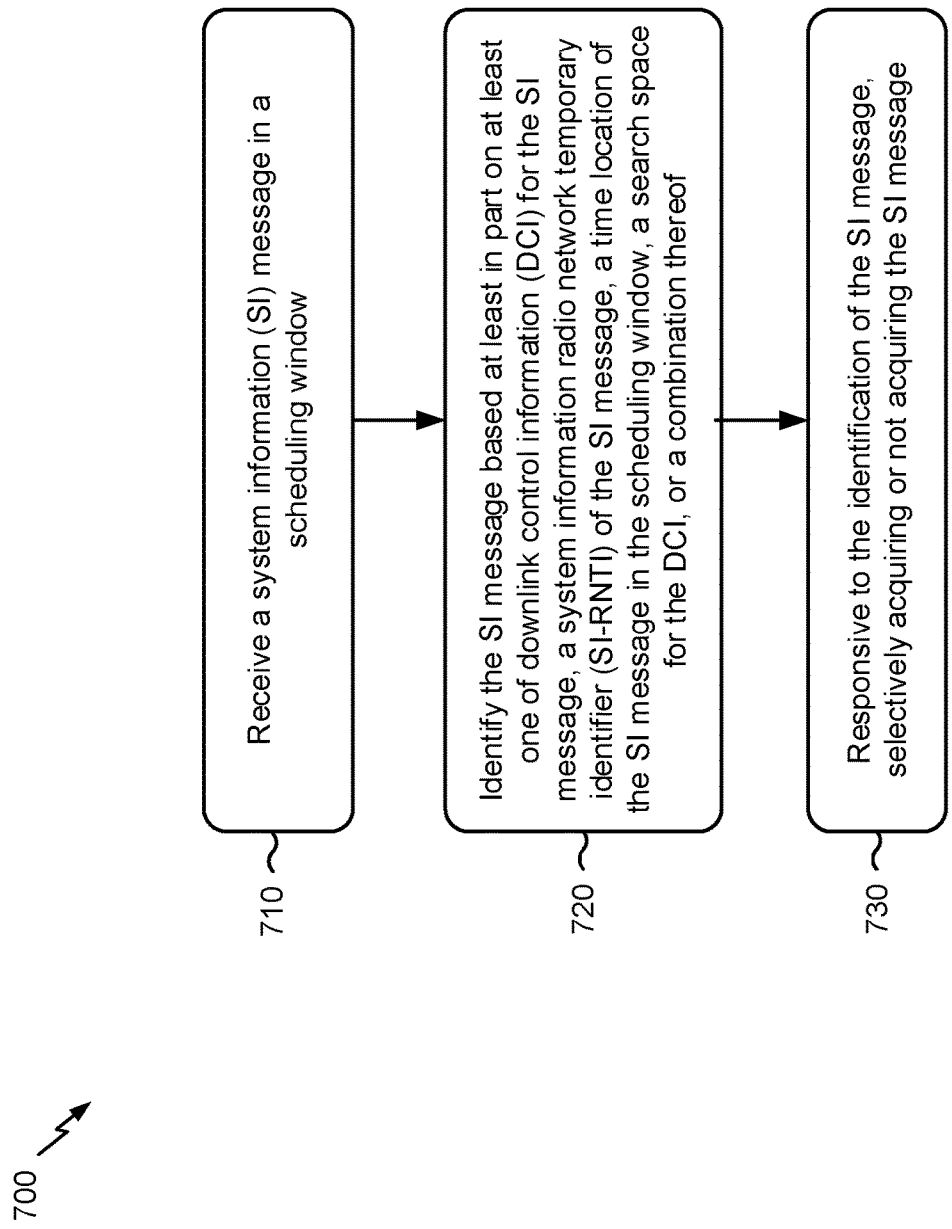

SYSTEM INFORMATION SCHEDULING

CROSS-REFERENCE TO RELATED APPLICATIONS UNDER 35 U.S.C. § 119

This application claims priority to Provisional Patent Application No. 62/691,525, filed on Jun. 28, 2018, entitled "TECHNIQUES AND APPARATUSES FOR SYSTEM INFORMATION SCHEDULING USING OVERLAPPED WINDOWS," which is hereby expressly incorporated by reference herein.

TECHNICAL FIELD OF THE DISCLOSURE

Aspects of the technology described below generally relate to wireless communication and to techniques and apparatuses for system information scheduling. Some techniques and apparatuses described herein enable and provide wireless communication devices and systems configured for efficient resource utilization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). One example of such a multiple access technology is Long-Term Evolution (LTE). A wireless communication network, such as LTE, may include a number of base stations (BSs) that can support communication for a number of user equipment (UEs). A user equipment (UE) may communicate with a base station (BS) via the downlink and uplink. System information blocks (SIBs) can refer to information sent to the UE from the BS that can include access information (e.g., in a SIB1) and/or other information for communication between UEs and the BS (e.g., in one or more other types of SIB). In LTE, SIB1 is broadcast at fixed time locations, and other SIBs are broadcast according to their scheduling information in SIB1. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards. Scheduling of SIBs in NR can differ from SIB scheduling in LTE to enable more efficient use of UE and network resources.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a UE, may include receiving a system information (SI) message in a scheduling window; and identifying the SI message based at least in part on at least one of: downlink control information (DCI) for the SI message, a system information radio network temporary identifier (SI-RNTI) of the SI message, a time location of the SI message in the scheduling window, a search space for the DCI, or a combination thereof.

In some aspects, a user equipment for wireless communication may include memory and one or more processors operatively coupled to the memory. The memory and the one or more processors may be configured to receive an SI message in a scheduling window; and identify the SI message based at least in part on at least one of: DCI for the SI message, an SI-RNTI of the SI message, a time location of the SI message in the scheduling window, a search space for the DCI, or a combination thereof.

In some aspects, a non-transitory computer-readable medium may store one or more instructions for wireless communication. The one or more instructions, when executed by one or more processors of a user equipment, may cause the one or more processors to receive an SI message in a scheduling window; and identify the SI message based at least in part on at least one of: DCI for the SI message, an SI-RNTI of the SI message, a time location of the SI message in the scheduling window, a search space for the DCI, or a combination thereof.

In some aspects, an apparatus for wireless communication may include means for receiving an SI message in a scheduling window; and means for identifying the SI message based at least in part on at least one of: DCI for the SI message, an SI-RNTI of the SI message, a time location of the SI message in the scheduling window, a search space for the DCI, or a combination thereof.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the drawings. It is to be noted, however, that the drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with various aspects of the present disclosure.

DETAILED DESCRIPTION

Figure 1:
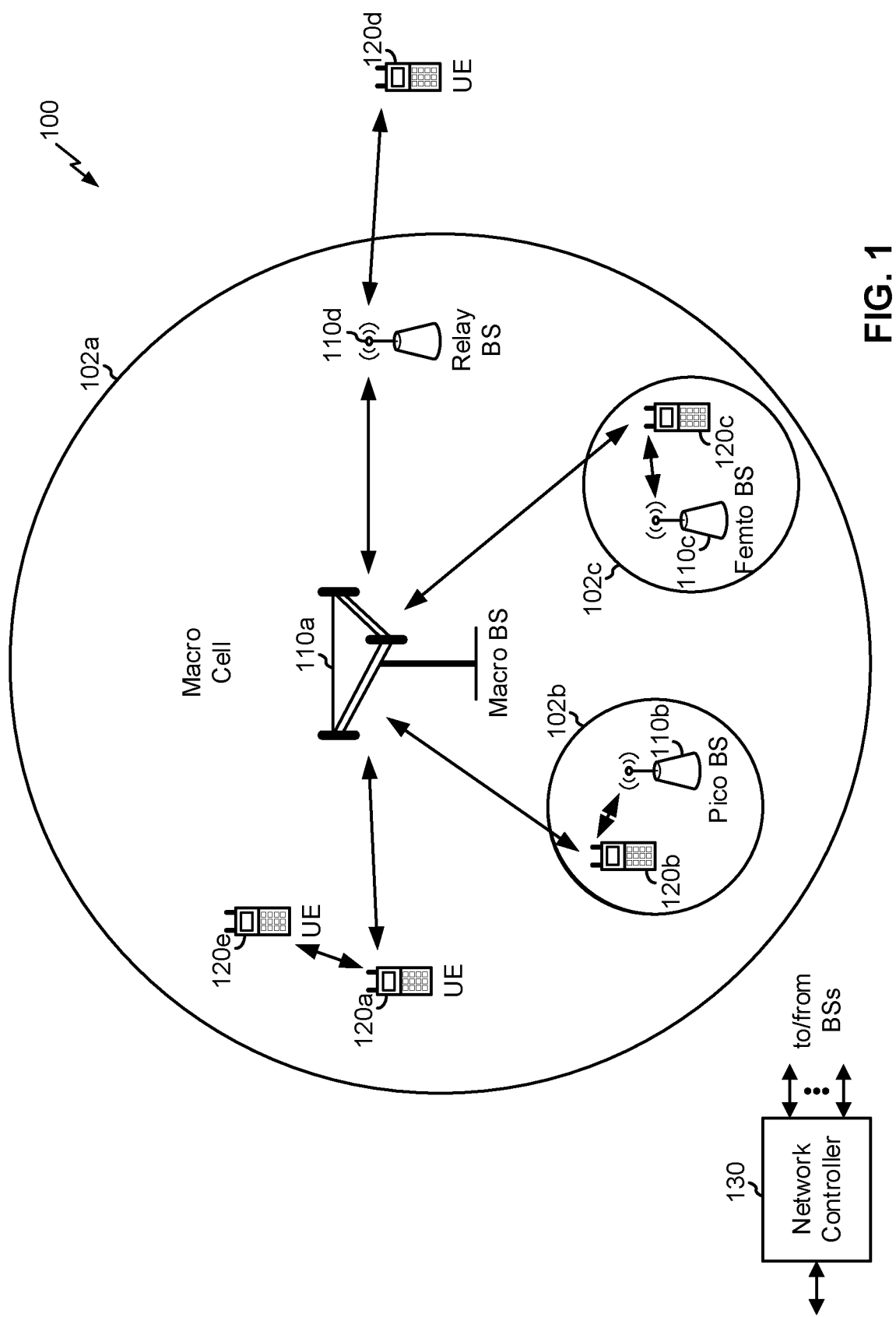
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what was described with regard to FIG. 1.

Figure 2:
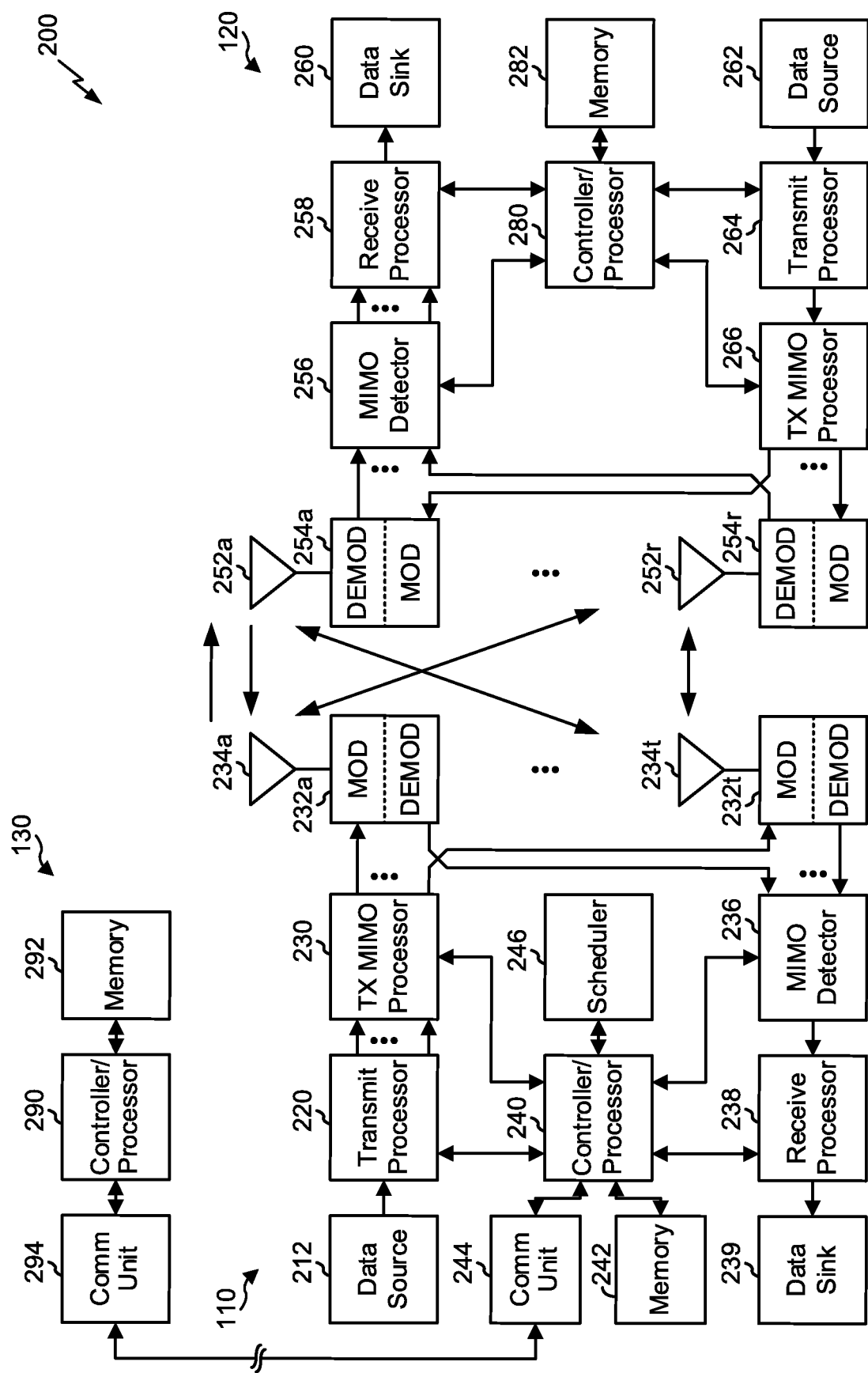
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with SI scheduling, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In one example, memory 282 of the UE 120 can be a non-transitory computer-readable medium storing one or more instructions for wireless communication, where the one or more instructions cause one or more processors, e.g., processor controller/processor 280 and/or receive processor 258, to cause the one or more processors to perform one or more aspects as described in FIG. 5, one or more aspects of processor 700 of FIG. 7, and/or other processes as described herein. A scheduler 246 may schedule UEs for data transmission on the downlink and/or uplink.

In some aspects, UE 120 may include means for receiving an SI message in an overlapped scheduling window, means for identifying the SI message based at least in part on at least one of DCI for the SI message, an SI-RNTI of the SI message, a time location of the SI message in the overlapped scheduling window, a search space for the DCI, or a combination thereof, and/or the like. In some aspects, such means may include one or more components of UE 120 described in connection with FIG. 2. More specifically, means for receiving the SI message can, but not necessarily, include antenna 252, DEMOD 254, MIMO detector 256, receive processor 258, controller/processor 280, and/or the like. Additionally, means for identifying the SI message can, but not necessarily, include receive processor 258, controller/processor 280, and/or the like.

As indicated above, FIG. 2 is provided as an example. Other examples may differ from what was described with regard to FIG. 2.

Figure 3A:
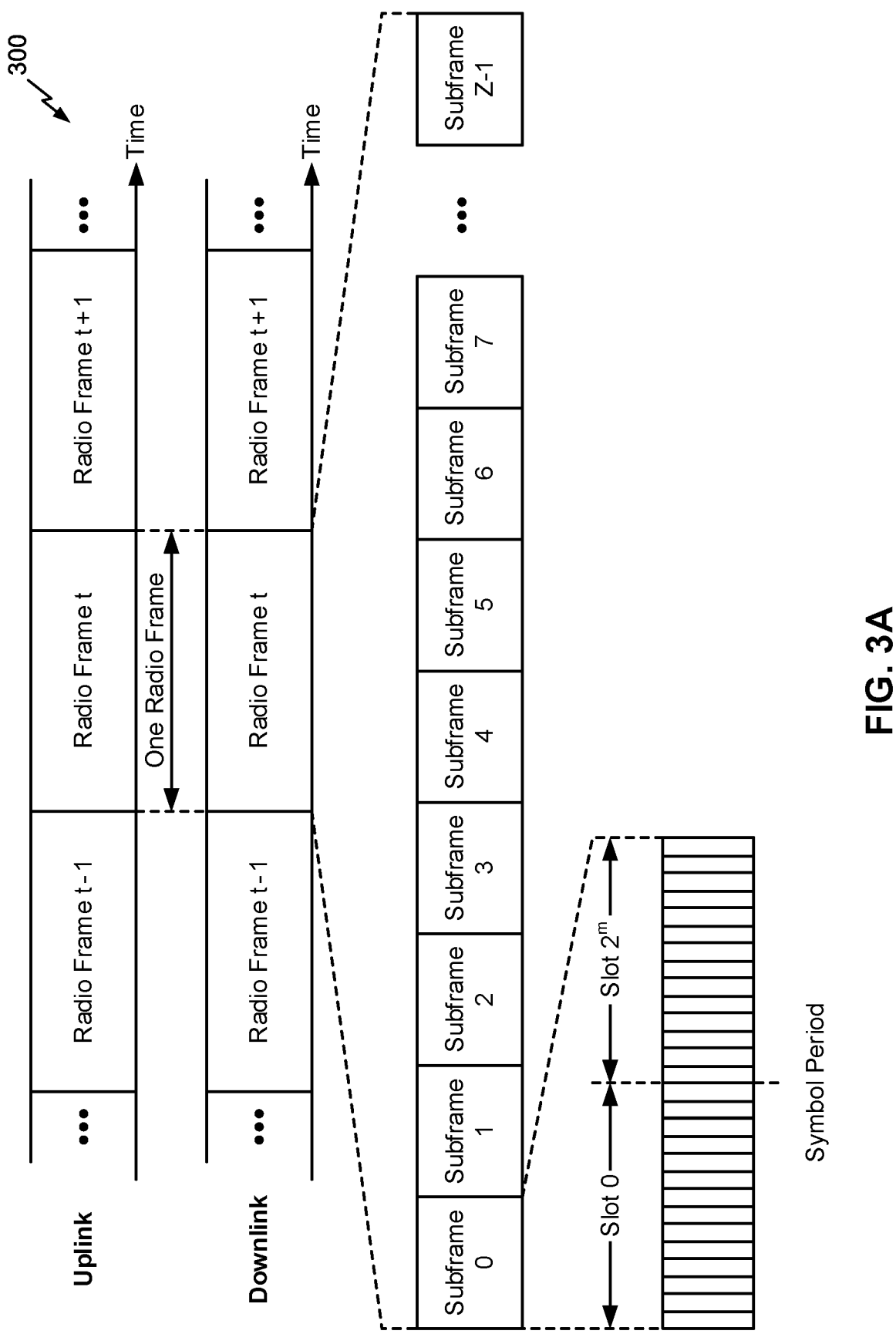
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
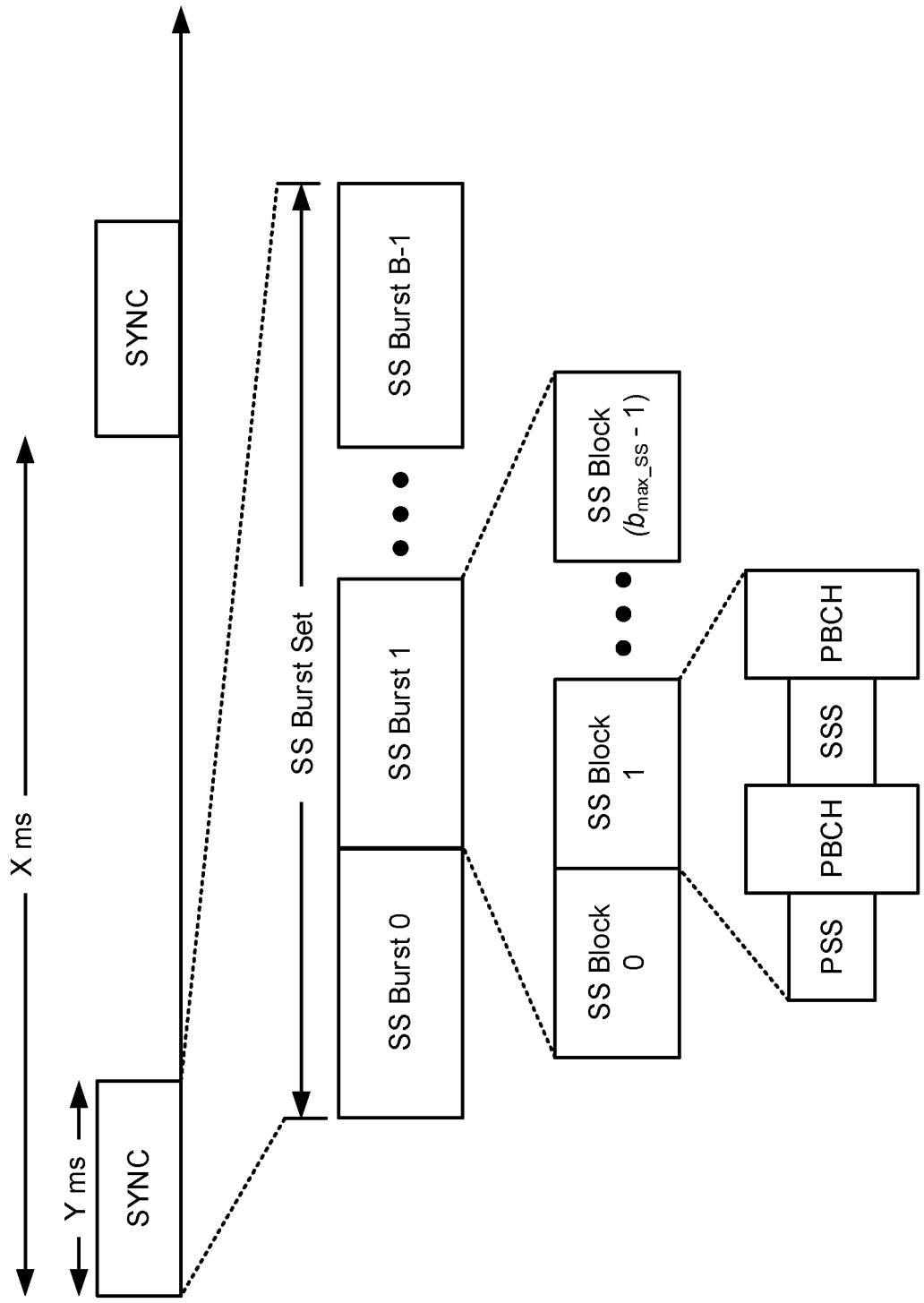
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
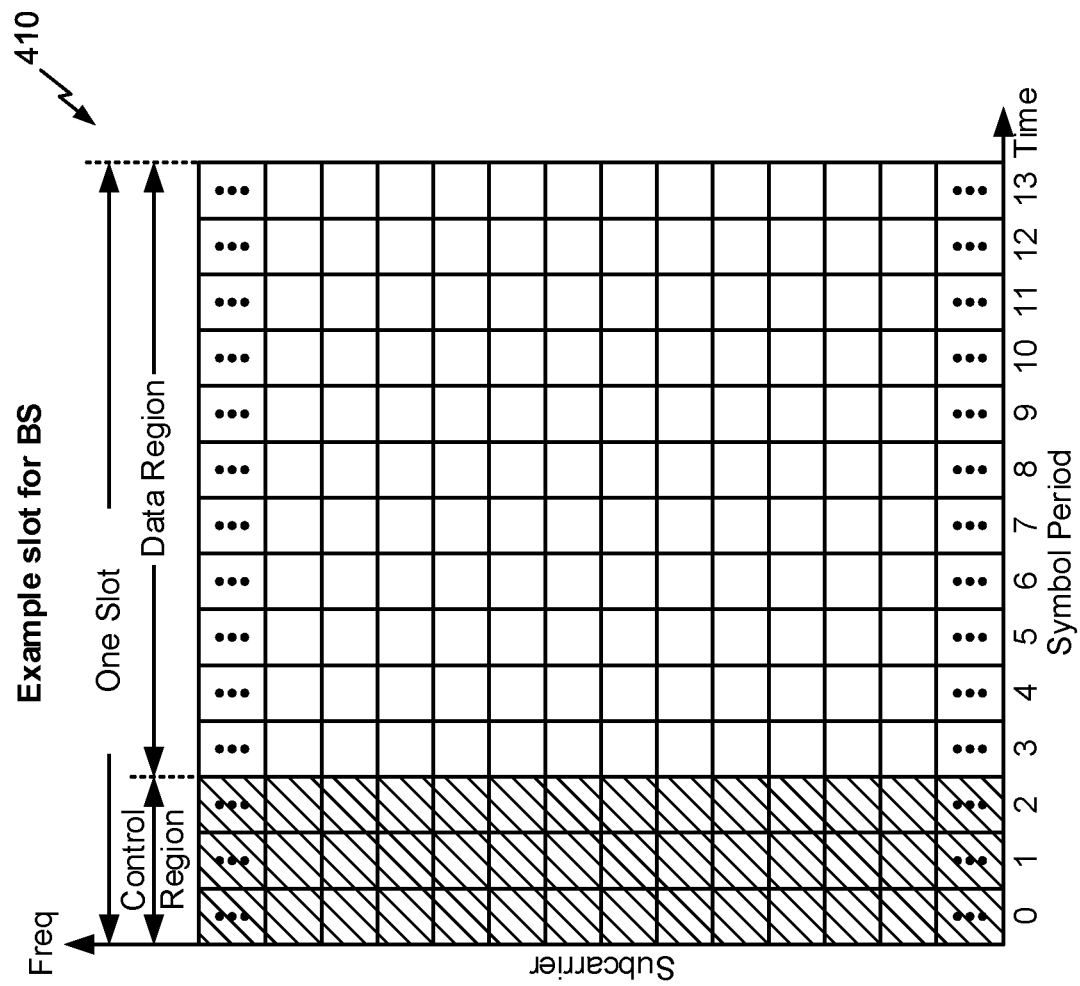
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

A BS may provide system information (SI) for UEs covered by the BS. SI may include physical layer information (e.g., in a master information block), access information (e.g., in a SIB1), and/or other information for communication between UEs and the BS (e.g., in one or more other types of SIB). One or more SIBs may be carried in an SI message. For example, SIB1 may be carried alone in an SI message, and one or more other SIBs may be carried in another SI message.

An SI message carrying SIB1 may be transmitted at fixed time locations, which may facilitate identification of SIB1. In a legacy approach, SIB1 carries scheduling information for later SI messages, and the later SI messages are transmitted in non-overlapping scheduling windows (e.g., scheduling windows that do not overlap each other or the window of SIB1). Thus, when the UE receives downlink control information (DCI) identifying an SI message, the UE may know which SI message is being scheduled based at least in part on the scheduling windows as indicated by the scheduling information of SIB1.

In some radio access technologies, such as 5G/NR, an overlapped scheduling window may be permitted. For example, the scheduling window for a first SI message may at least partially overlap the scheduling window of a second SI message. As a result, when an SI message is received in an overlapped scheduling window, a UE may be unable to determine to which scheduling window the SI message belongs without first decoding the SI message. For example, the UE may be unable to determine whether the UE is receiving the first SI message or the second SI message in the overlapped scheduling window.

It may be desirable to determine which SI message is received before decoding the SI message. For example, this may allow soft combining across repetitions of SI messages, and may conserve resources that would be used to decode an irrelevant SIB.

Some techniques and apparatuses described herein identify an SI message based at least in part on DCI for the SI message, a search space in which the DCI is detected, a system information radio network temporary identifier (SI-RNTI) associated with the SI message, a time location of the SI message, and/or a combination of the above. Thus, a UE may determine which SI message is received, which improves efficiency of communication of the UE, enables soft combining, and conserves resources that would be used to decode irrelevant SI messages, particularly when the SI message is received in an overlapped scheduling window.

Figure 5:
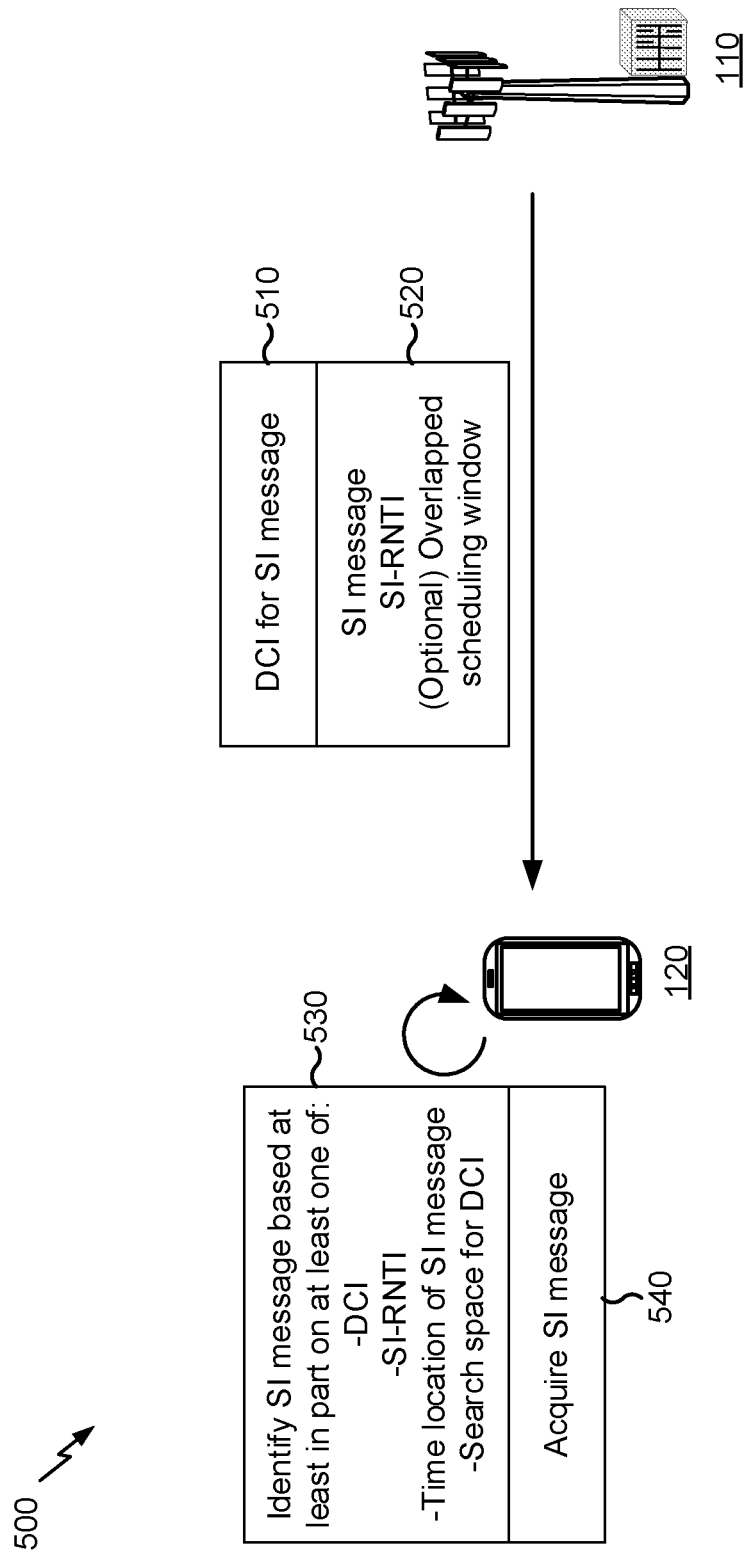
FIG. 5 is a diagram illustrating an example of SI scheduling, in accordance with various aspects of the present disclosure.

FIG. 5 is a diagram illustrating an example 500 of SI scheduling using overlapped scheduling windows, in accordance with various aspects of the present disclosure.

As shown in FIG. 5, and by reference number 510, a BS 110 may provide DCI for an SI message, and a UE 120 may receive the DCI for the SI message. For example, the DCI may identify a resource allocation for the SI message. In some aspects, the DCI may include one or more bits that indicate a type of the SI message. For example, the DCI may include one or more spare bits. In some aspects, the one or more bits may use a first value for a first SI message (e.g., an SI message containing a SIB1), and a second value for a second SI message (e.g., an SI message containing a SIB other than a SIB1). In some aspects, the one or more bits may have a different value for each SI message that can be received by the UE 120 (e.g., to distinguish between different SI messages).

In some aspects, the BS 110 may provide configuration information (e.g., radio resource control information and/or the like) indicating a mapping between values of the one or more bits and SI message types. In some aspects, the DCI may indicate SI message types for multiple, different messages. For example, the DCI may include a bitmap and/or the like that indicates the SI message types for the multiple, different messages. In some aspects, the DCI may indicate SI message types of each SI message granted by the DCI. In some aspects, the DCI may indicate SI message types for a subset of SI messages granted by the DCI.

In some aspects, the DCI may be provided in a particular search space. The search space may indicate which type of SI message is granted by the DCI. For example, the BS 110 may provide the DCI in a first search space when a first type of SI message (e.g., an SI message containing SIB1) is granted by the DCI, and may provide the DCI in a second search space when a second type of SI message (e.g., an SI message containing another SIB, an SI message containing a particular SIB other than SIB1, an SI message containing a particular set of SIBs, etc.).

As shown by reference number 520, in some aspects, the BS 110 may provide the SI message in an overlapped scheduling window. For example, the BS 110 may provide the SI message using the resources granted by the DCI. As further shown, the SI message may be associated with an SI-RNTI. The SI-RNTI may be used for broadcasting system information. For example, the SI message may be scrambled using the SI-RNTI. In some aspects, the BS 110 may provide the SI message using a particular SI-RNTI, which may indicate a type of the SI message. For example, the BS 110 may use a first SI-RNTI to scramble an SI message of a first type (e.g., a SIB1), and may use a second SI-RNTI to scramble an SI message of a second type (e.g., a SIB other than a SIB1).

In some aspects, the BS 110 may provide the SI message in a particular time location. For example, the BS 110 may provide the SI message in a particular time location that indicates a type of the SI message. In such a case, the BS 110 may provide a first type of SI message (e.g., a SIB1) in a first time location or a first portion of the overlapped window, and may provide a second type of SI message (e.g., a SIB other than a SIB1) in a second time location or a second portion of the overlapped window.

As shown by reference number 530, the UE 120 may identify the SI message. For example, the UE 120 may identify the SI message (e.g., a type of the SI message, a content of the SI message, one or more SIBs included in the SI message, etc.) based at least in part on at least one of the DCI, the SI-RNTI, a time location of the SI message, or a search space of the DCI. Each of these approaches is described in turn below and may be used alone or in any combination.

In some aspects, the UE 120 may identify the SI message based at least in part on the DCI. For example, the UE 120 may determine a value of one or more bits of the DCI, and may identify the SI message based at least in part on a mapping between the value and one or more bits of the DCI.

In some aspects, the UE 120 may identify the SI message based at least in part on a search space or control resource set of the DCI. For example, the UE 120 may identify the SI message based at least in part on a mapping between the search space in which the DCI is detected and a type of the SI message. In such a case, the same DCI and/or SI-RNTI may be used for all SI messages, and SI messages may be distinguished by the search space or control resource set in which the DCI is detected.

In some aspects, the UE 120 may identify the SI message based at least in part on the SI-RNTI. For example, the UE 120 may determine a value of the SI-RNTI, and may identify the SI message based at least in part on a mapping between the value of the SI-RNTI and the SI message.

In some aspects, the UE 120 may identify the SI message based at least in part on the time location of the SI message. For example, in some cases, a particular SI message may be associated with a particular time window. In other words, the transmission duration for an SI message may be shorter than the overlapped scheduling window. In some aspects, the BS 110 may transmit all SI messages using each beam provided by the BS 110 (e.g., since the BS 110 may not know which beam is selected by the UE 120 to receive the SI message). In such a case, the BS 110 may perform time division multiplexing in the overlapped scheduling window with regard to different SI messages and different beams. In this way, a UE 120 may identify an SI message based at least in part on a time location of the SI message, and may monitor a diminished duration in comparison to the entire overlapped scheduling window, which conserves battery life of the UE 120.

In some aspects, an scheduling window associated with a first SI message may share an overlapped region with another scheduling window, corresponding to a second SI message. In some aspects, the BS 110 may use the same DCI and SI-RNTI for both scheduling windows, and the scheduling windows may be configured so that a certain UE 120 will always receive different SIB messages at different times. This may be configured by allowing overlapping windows from the network side and ensuring that transmissions of both the first SI message the second SI message using a specific beam are not transmitted in the overlapping region. For example, if there are 16 beams in an scheduling window, the second scheduling window might start at beam #10 of the first scheduling window, and only the time locations corresponding to the first 6 beams of the second window may be in the overlapping region. Thus, a UE may know, when beams 10-16 are received in the overlapping portion, that the SI message is the first SI message. In such a case, the BS 110 may perform simultaneous transmission of two or more beams, sometimes referred to as digital beamforming.

In some aspects, the BS 110 may be flexible in terms of assigning locations (e.g., search spaces) for transmissions for different beams, as long as the UE 120 can determine the SI message type by monitoring the time locations corresponding to a specific beam. In such a case, there may be an association between a beam (e.g., based at least in part on a synchronization signal block index) and search space for the SI message. Thus, SI messages may be transmitted using particular search spaces, which allows SI messages in overlapped regions of the scheduling window to be differentiated.

In some aspects, the UE 120 or the BS 110 may combine two or more of the above approaches to differentiate an SI message. For example, the UE 120 may use a specific DCI value and different SI-RNTIs for two scheduling windows, or may use non-overlapping dedicated time locations to indicate an SI message for SIB1 (or for a subset of SIBs) and may use particular time resources or search spaces to indicate SI messages for the other SIBs.

Another combination option is to assign different SI-RNTIs, DCIs, and/or search spaces to SI messages which are overlapping. For example, if two scheduling windows are overlapping, different SI-RNTI, DCI values, or search spaces can be used. In such a case, the UE 120 can distinguish the SI message by SI-RNTI or DCI, or based at least in part on the search space.

As shown by reference number 540, the UE 120 may acquire the SI message. For example, when the SI message is relevant to the UE 120, the UE 120 may descramble the SI message using the SI-RNTI. The UE 120 may decode the descrambled message to obtain one or more SIBs. In some aspects, the UE 120 may discard the SI message or may not decode the SI message (e.g., when the UE 120 determines that the SI message is not relevant to the UE 120). Thus, a UE 120 may identify an SI message with an overlapped window, thereby improving efficiency and enabling soft combining of repetitious SI messages (e.g., for SIB1 and/or other SIBs).

As indicated above, FIG. 5 is provided as an example. Other examples may differ from what was described with respect to FIG. 5.

Figure 6:
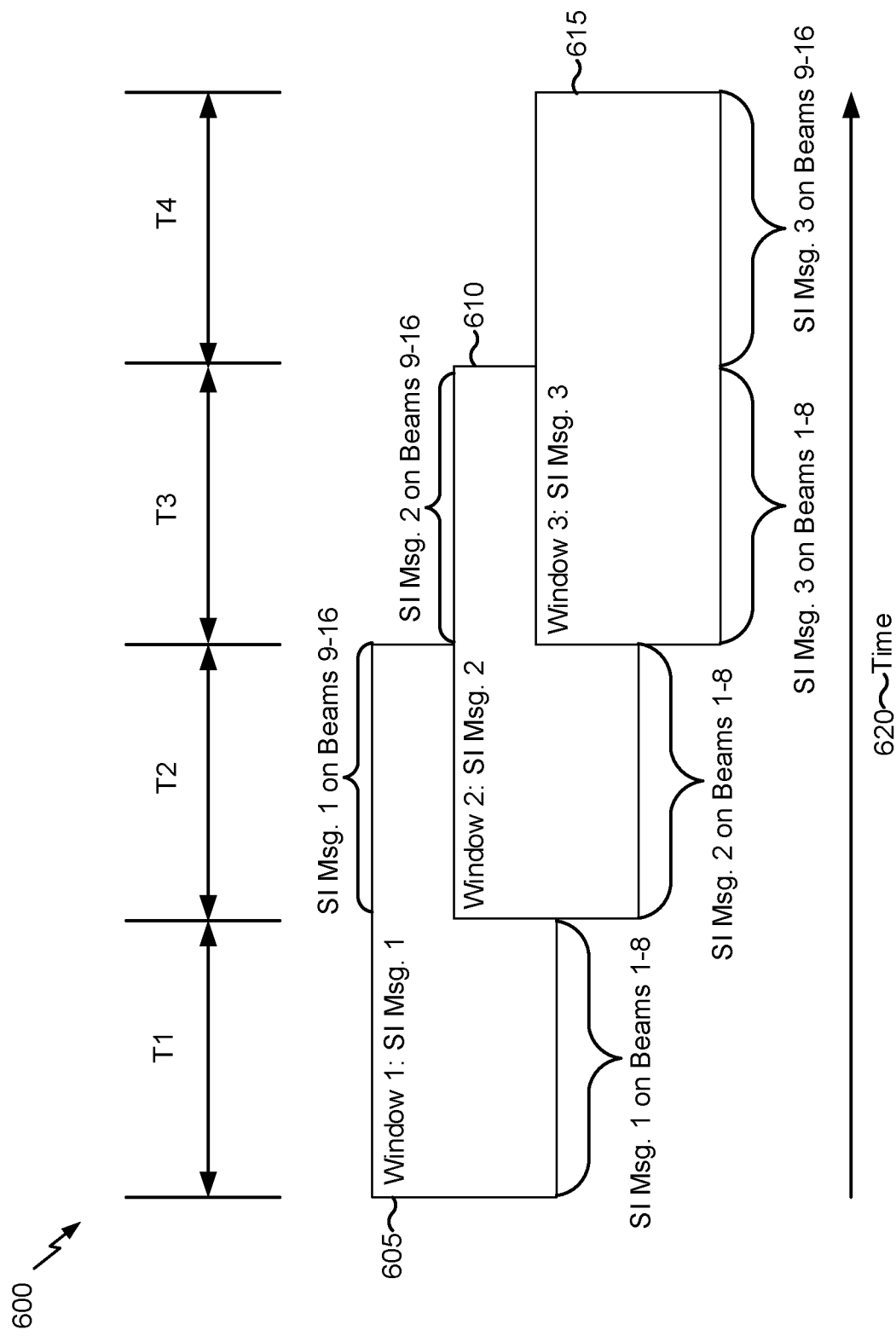
FIG. 6 is a diagram illustrating an example of overlapped scheduling windows and time-dependent scheduling of SI transmission beams, in accordance with various aspects of the present disclosure.

FIG. 6 is a diagram illustrating an example 600 of overlapped scheduling windows and time-dependent scheduling of SI transmission beams, in accordance with various aspects of the present disclosure. FIG. 6 shows a first scheduling window (e.g., Window 1, shown by reference number 605) for a first SI message (e.g., SI Msg. 1), a second scheduling window (e.g., Window 2, shown by reference number 610) for a second SI message (e.g., SI Msg. 2), and a third scheduling window (e.g., Window 3, shown by reference number 615) for a third SI message (e.g., SI Msg. 3). As shown by reference number 620, a horizontal dimension of example 600 represents time. For the purpose of FIG. 6, assume that each scheduling window includes 16 beams. In other words, by the end of Window 1, the first SI message will have been transmitted using each of beam 1 through 16. The BS 110 may transmit the first SI message using each beam since the BS 110 may not know which beams have been selected by UEs 120, which improves operation and efficiency of the network.

Example 600 shows an example wherein SI messages are transmitted at particular time locations using a subset of beams of a scheduling window. For example, in the time window T1, SI message 1 (SI Msg. 1) is transmitted using only beams 1 through 8. Thus, any UE 120 that receives an SI message on beams 1 through 8 during T1 may know that the received SI message is SI message 1. Similarly, in the time window T2, SI message 1 is transmitted using beams 9-16, and SI message 2 (SI Msg. 2) is transmitted using beams 1-8. Thus, a UE 120 that receives an SI message in the overlapped region of Window 1 and Window 2 may know whether the received SI message is SI message 1 or SI message 2 based at least in part on which beam is received. Furthermore, a UE 120 may monitor less of the scheduling window after selecting a beam, which conserves battery power of the UE 120. For example, in this case, the UE 120 may only monitor the half of the scheduling window corresponding to the UE 120's selected beam.

Example 600 is just one example of overlapping scheduling window configurations. In some aspects, the windows may be overlapped more completely or less completely. Additionally, or alternatively, three or more windows may be overlapped in a particular time location. Additionally, or alternatively, the time periods associated with the various scheduling windows and beams may be multiplexed at a higher granularity. For example, a first time window may be used for transmitting an SI message with a first four beams, a second time window may be used for transmitting an SI message with a second four beams, and so on.

As indicated above, FIG. 6 is provided as an example. Other examples may differ from what was described with respect to FIG. 6.

FIG. 7 is a diagram illustrating an example process 700 performed, for example, by a UE, in accordance with various aspects of the present disclosure. Example process 700 is an example of a method of wireless communication performed by the UE 120 for identifying an SI message from within a scheduling window.

As shown in FIG. 7, in some aspects, process 700 may include receiving a system information (SI) message in a scheduling window (block 710). For example, the UE (e.g., using antenna 252, DEMOD 254, MIMO detector 256, receive processor 258, controller/processor 280, and/or the like) may receive a system information (SI) message in a scheduling window, as described above.

As further shown in FIG. 7, in some aspects, process 700 may include identifying the SI message based at least in part on at least one of downlink control information (DCI) for the SI message a system information radio network temporary identifier (SI-RNTI) of the SI message, a time location of the SI message in the scheduling window, a search space for the DCI, or and a combination thereof (block 720). For example, the UE (e.g., using receive processor 258, controller/processor 280, and/or the like) may identify the SI message based at least in part on at least one of downlink control information (DCI) for the SI message, a system information radio network temporary identifier (SI-RNTI) of the SI message, a time location of the SI message in the scheduling window, a search space for the DCI, or and a combination thereof, as described above.

As further shown in FIG. 7, in some aspects, process 700 may include, responsive to the identification of the SI message, selectively acquiring or not acquiring the SI message (block 730). For example, the UE (e.g., using DEMOD 254, MIMO detector 256, receive processor 258, controller/processor 280, and/or the like) may selectively acquire (e.g., decode) or not acquire (e.g., drop, discard, not decode) the SI message, as described above.

Process 700 may include additional aspects, such as any single aspect or any combination of aspects described below and/or in connection with one or more other processes described elsewhere herein.

In a first aspect, the scheduling window of the SI message overlaps with a scheduling window of another SI message.

In a second aspect, alone or in combination with the first aspect, responsive to the identification of the SI message, the UE may selectively acquire or not acquire the SI message.

In a third aspect, alone or in combination with one or more of the first and second aspects, the SI message is identified by one or more bits in the DCI.

In a fourth aspect, alone or in combination with one or more of the first through third aspects, the DCI includes a first value to identify an SI message that contains a system information block 1 (SIB1) or a second value to identify an SI message that contains any system information block (SIB) other than SIB1.

In a fifth aspect, alone or in combination with one or more of the first through fourth aspects, a system information block type of the SI message is identified based at least in part on the SI-RNTI being associated with the system information block type.

In a sixth aspect, alone or in combination with one or more of the first through fifth aspects, the scheduling window is a first scheduling window that overlaps a second scheduling window at an overlapping region, the SI message is received in a transmission using a beam, and the transmission using the beam is not repeated in the overlapping region for the first scheduling window and for the second scheduling window.

In a seventh aspect, alone or in combination with one or more of the first through sixth aspects, the scheduling window is a configured overlapped scheduling window, and the process may include monitoring a particular portion of the configured overlapped scheduling window to identify the SI message. The monitored particular portion of the configured overlapped scheduling window can include the time location. For example, the UE (e.g., using DEMOD 254, MIMO detector 256, receive processor 258, controller/processor 280, and/or the like) may monitor the particular portion of the configured overlapped scheduling window to identify the SI message, as described above.

In an eighth aspect, alone or in combination with one or more of the first through seventh aspects, the scheduling window is a first scheduling window that overlaps a second scheduling window at an overlapping region, and the SI message and an SI message of the second scheduling window are associated with a same SI-RNTI and a same DCI.

In a ninth aspect, alone or in combination with one or more of the first through eighth aspects, identifying the SI message is further based at least in part on a mapping between the SI message and the search space in which the DCI for the SI message is detected.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise forms disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a downlink control information (DCI) identifying a resource allocation for a message in a scheduling window;
   receiving the message containing a system information block (SIB) in the scheduling window according to the received DCI, wherein a SIB 1 (SIB1) within the scheduling window associated with the message allocated by the DCI can overlap with at least one SIB other than SIB1 within the scheduling window; and
   identifying the SIB within the message based at least in part on the DCI,
      wherein the DCI includes a single bit that has a first value to identify the SIB1 or a second value to identify any SIB other than SIB1.

2. The method of claim 1, further comprising:
   responsive to the identification of the SIB, selectively acquiring or not acquiring the message.

3. The method of claim 1, wherein a system information block type of the message is identified based at least in part on a system information radio network temporary identifier (SI-RNTI) of the message.

4. The method of claim 1, wherein the scheduling window is a configured overlapped scheduling window, further comprising monitoring a particular portion of the configured overlapped scheduling window, the particular portion including a time location of the message, to identify the message.

5. The method of claim 1, wherein identifying the message is further based at least in part on a mapping between the message and a search space in which the DCI for the message is detected.

6. The method of claim 1, wherein the SIB within the message is identified based at least in part on a time location of the scheduling window.

7. The method of claim 1, wherein receiving the DCI comprises:
   receiving the DCI in a first search space when the message comprises the SIB1 and receiving the DCI in a second search space when the message comprises the any SIB other than SIB1.

8. The method of claim 1, wherein the message is received in a transmission using a beam.

9. The method of claim 1, wherein the message is associated with a mapping between the message and a search space in which the DCI for the message is detected.

10. A user equipment (UE) for wireless communication, comprising:
    a memory; and
    one or more processors operatively coupled to the memory, the memory and the one or more processors configured to:
       receive a downlink control information (DCI) identifying a resource allocation for a message in a scheduling window;
       receive the message containing a system information block (SIB) in the scheduling window according to the received DCI, wherein a SIB 1 (SIB1) within the scheduling window associated with the message allocated by the DCI can overlap with at least one SIB other than SIB1 within the scheduling window; and
       identify the SIB within the message based at least in part on the DCI,
          wherein the DCI includes a single bit that has a first value to identify the SIB1 or a second value to identify any SIB other than SIB1.

11. The UE of claim 10, wherein the one or more processors are further configured to:
    responsive to the identification of the SIB, selectively acquire or not acquire the message.

12. The UE of claim 10, wherein a system information block type of the message is identified based at least in part on a system information radio network temporary identifier (SI-RNTI) of the message.

13. The UE of claim 10, wherein the scheduling window is a configured overlapped scheduling window, and wherein the UE is configured to monitor a particular portion of the configured overlapped scheduling window, the particular portion including a time location of the message, to identify the message.

14. The UE of claim 10, wherein identifying the message is further based at least in part on a mapping between the message and a search space in which the DCI for the message is detected.

15. The UE of claim 10, wherein the SIB within the message is identified based at least in part on a time location in the scheduling window.

16. The UE of claim 10, wherein the one or more processors, when receiving the DCI, are configured to:
    receive the DCI in a first search space when the message comprises the SIB1 and receive the DCI in a second search space when the message comprises any SIB other than SIB1.

17. A non-transitory computer-readable medium storing one or more instructions for wireless communication, the one or more instructions comprising:
    one or more instructions that, when executed by one or more processors of a user equipment (UE), cause the one or more processors to:
       receive a downlink control information (DCI) identifying a resource allocation for a message in a scheduling window;

receive the message containing a system information block (SIB) in the scheduling window according to the received DCI, wherein a SIB 1 (SIB1) within the scheduling window associated with the message allocated by the DCI can overlap with at least one SIB other than SIB1 within the scheduling window; and identify the SIB within the message based at least in part on the DCI, wherein the DCI includes a single bit that has a first value to identify the SIB1 or a second value to identify any SIB other than SIB1.

18. An apparatus for wireless communication, comprising:

means for receiving a downlink control information (DCI) identifying a resource allocation for a message in a scheduling window;

means for receiving the message containing a system information block (SIB) in the scheduling window according to the received DCI, wherein a SIB 1 (SIB1) within the scheduling window associated with the message allocated by the DCI can overlap with at least one SIB other than SIB1 within the scheduling window; and means for identifying the SIB within the message based at least in part on the DCI, wherein the DCI includes a single bit that has a first value to identify the SIB1 or a second value to identify any SIB other than SIB1.

19. The apparatus of claim 18, further comprising:

responsive to the identification of the SIB, means for selectively acquiring or not acquiring the message.

20. The apparatus of claim 18, wherein a system information block type of the message is identified based at least in part on a system information radio network temporary identifier (SI-RNTI) of the message.

21. The apparatus of claim 18, wherein the scheduling window is a configured overlapped scheduling window, and wherein the apparatus includes means for monitoring a particular portion of the configured overlapped scheduling window, the overlapping scheduling window including a time location of the message, to identify the message.

* * * * *